United States Patent
Thomson et al.

(10) Patent No.: US 9,440,481 B1
(45) Date of Patent: Sep. 13, 2016

(54) TRANSACTION CARD WITH CARBON FIBER SUBSTRUCTURE AND METHOD OF MAKING SAME

(75) Inventors: Todd S. Thomson, Rowayton, CT (US); John Herslow, Scotch Plains, NJ (US); Michele Logan, Madison, NJ (US)

(73) Assignee: Citicorp Credit Services, Inc., Sioux Falls, SD (US)

( * ) Notice: Subject to any disclaimer, the term of this patent is extended or adjusted under 35 U.S.C. 154(b) by 2653 days.

(21) Appl. No.: 12/078,762

(22) Filed: Apr. 4, 2008
(Under 37 CFR 1.47)

Related U.S. Application Data

(60) Provisional application No. 60/922,343, filed on Apr. 6, 2007.

(51) Int. Cl.
*B32B 3/00* (2006.01)
*B32B 19/02* (2006.01)
*B32B 27/04* (2006.01)
*B42D 25/20* (2014.01)

(52) U.S. Cl.
CPC ............... *B42D 25/20* (2014.10); *B32B 19/02* (2013.01); *B32B 27/04* (2013.01); *B32B 3/00* (2013.01)

(58) Field of Classification Search
None
See application file for complete search history.

(56) References Cited

U.S. PATENT DOCUMENTS

| | | | | |
|---|---|---|---|---|
| 4,497,872 A | * | 2/1985 | Hoppe et al. | 428/483 |
| D280,214 S | | 8/1985 | Opel | D19/10 |
| 4,686,135 A | * | 8/1987 | Obayashi et al. | 442/94 |
| 4,728,564 A | * | 3/1988 | Akagi et al. | 442/164 |
| D457,556 S | | 5/2002 | Hochschild | D19/9 |
| 6,482,495 B1 | * | 11/2002 | Kohama et al. | 428/67 |
| 6,644,552 B1 | | 11/2003 | Herslow | 235/488 |
| D523,472 S | | 6/2006 | Brink et al. | D19/9 |
| 2005/0040243 A1 | * | 2/2005 | Bi et al. | 235/492 |
| 2006/0251869 A1 | | 11/2006 | Herslow | 428/204 |

* cited by examiner

*Primary Examiner* — Gerard Higgins
*Assistant Examiner* — Sathavaram I Reddy
(74) *Attorney, Agent, or Firm* — John M. Harrington; Johnson, Marcou & Isaacs, LLC

(57) ABSTRACT

A transaction card has a substructure consisting at least in part of a layer of fibrous material, such as carbon fiber strands or filaments, arranged in a pre-selected pattern, such as a weave pattern, that is at least partially enclosed by a transparent plastic film. A sheet is laminated on each of two opposing faces of the substructure to form a transaction card core. One or both of the sheets laminated on the opposing faces of the substructure is also made of a transparent material, and one or both of the two opposing faces of the transaction card core can be printed. An over-laminate film, such as a transparent polyvinyl chloride plastic film, can be laminated on each of two opposing faces of the transaction card core.

15 Claims, 4 Drawing Sheets

TRANSACTION CARD WITH CARBON FIBER SUBSTRUCTURE AND METHOD OF MAKING SAME

PRIORITY APPLICATION

This application claims priority to U.S. Provisional Application No. 60/922,343 filed Apr. 6, 2007, entitled "TRANSACTION CARD WITH CARBON FIBER SUBSTRUCTURE", which is incorporated herein by this reference.

FIELD OF THE INVENTION

The present invention relates generally to the field of transaction cards and more particularly to a transaction card having a carbon fiber substructure.

BACKGROUND OF THE INVENTION

The transaction card industry currently utilizes a transaction card, such as a credit card or debit card, made of certain materials and according to a certain specification range, such as the ISO 7810 standard. That material basically comprises a white core of polyvinyl chloride (PVC) plastic, with a surface which can be printed with text and/or graphics. The card is then overlaid front and back with thin transparent or clear PVC plastic which sandwiches the card. After overlaying the card, certain finishing work is performed on the card to turn it into a transactable product for use, for example, at a card reader or card device, such as an automatic teller machine (ATM).

A typical transaction card consists, for example, of four layers. According to industry standards, a typical credit card cannot be greater than 33 mils or less than 27 mils in thickness. The transaction card industry traditionally uses a process known as "split core" in which the inside materials or core of the card consist of two separate pieces of plastic material, such as two pieces of white PVC plastic, each of which is 13½ mils in thickness. On top of those two pieces are laminated a two mil over-laminate of clear plastic on the front and another two mil over-laminate of clear plastic on the back of the core. In other words, the two pieces of white PVC plastic inner core or split core materials, 13½ mils each, are joined together to form a core 27 mils thick, which is concurrently over-laminated with the clear or transparent plastic over-laminates to form a transaction card that is 30 mils thick. All imaging, typography and the like are printed on the front and back exposed outer surfaces of the white PVC plastic inner core, after the split core components are joined together, and thereafter the over-laminates are applied.

SUMMARY OF THE INVENTION

It is a feature and advantage of the present invention to provide a transaction card having a carbon fiber substructure which has an aesthetically unique appearance, as well as extreme durability.

To achieve the stated and other features, advantages and objects, embodiments of the present invention provide a transaction card that incorporates a woven carbon fiber substructure into the body of a standard credit card form. The carbon fiber substructure for embodiments of the invention is built from carbon fiber strands or filaments woven into a weave pattern component which is then adhesive mounted between two layers of clear plastic film. The substructure is then mounted between clear PVC plastic layers of a transaction card, such as a credit card, and the card is then laminated to form the transaction card inner core. The outer surface of the inner core can be printed with various text, graphics, logos, phone numbers, and the like, and a thin layer over-laminate of clear plastic, such as PVC plastic film, can be applied to the outer surface of each of the clear polyester layers of the transaction card inner core.

Embodiments of the invention propose a transaction card with a substructure consisting at least in part of a layer of fibrous material, such as carbon fiber strands or filaments, arranged in a pre-selected pattern, such as a weave pattern. The fibrous material layer is at least partially enclosed by a transparent plastic film. Alternate embodiments can employ other fibrous materials, such as one or more of mineral fiber strands or filaments, glass fiber strands or filaments, metal fiber strands or filaments, or polymer fiber strands or filaments. In addition, the substructure for embodiments of the invention can utilize one or more substrate materials, such as amorphous polyethylene terephthalate (PET) plastic, biaxially oriented PET plastic, or polyvinyl chloride (PVC) plastic and/or one or more adhesive materials, such as polyethylene, acrylic, cyanoacrylate, and epoxy.

In embodiments of the invention, a sheet is laminated on each of two opposing faces of the substructure to form a transaction card core. One or both of the sheets laminated on the opposing faces of the substructure is also made of a transparent material, such as transparent PVC plastic material, and one or both of the two opposing faces of the transaction card core can be printed. An over-laminate film, such as a transparent PVC plastic film, can be laminated on each of two opposing faces of the transaction card core. According to embodiments of the invention the substructure, as well as the two sheets laminated on the opposing faces of the substructure, can each have a substantially equal thickness of 10 mils or a little less, and the over-laminate transparent film can have a thickness of about 1 mil more or less, so that the overall thickness of the resulting transaction card is not greater than 30 mils±10%.

Additional objects, advantages and novel features of the invention will be set forth in part in the description which follows, and in part will become more apparent to those skilled in the art upon examination of the following, or may be learned by practice of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Embodiments of the present invention utilize carbon fiber as a component of a transaction card, such as a credit card, a debit card, a smart card, and/or any other type of transaction card (it being understood that "transaction card" as used herein includes, without limitation, credit card, debit card, ATM card, gift card, loyalty card, smart card, stored value card, contactless card, access card, payment card, etc.). Such use of carbon fiber as a component of a transaction card not only addresses an issue of aesthetics by providing a unique appearance, but also addresses an issue of practicality by providing a transaction card of extreme durability.

The transaction card for embodiments of the invention incorporates a carbon fiber substructure, such as a woven carbon fiber substructure, into the body of a standard credit card form, such as ISO CR80 [the dimensions of which are 3.375"×2.125" (85.6 mm×54 mm)]. It is to be noted that the reference to the ISO CR80 standard is not intended to be exclusive, and embodiments of the invention include all types and sizes of transaction cards according to any other standard or standards, as well as all types and sizes of non-standard transaction cards.

Figure 1:
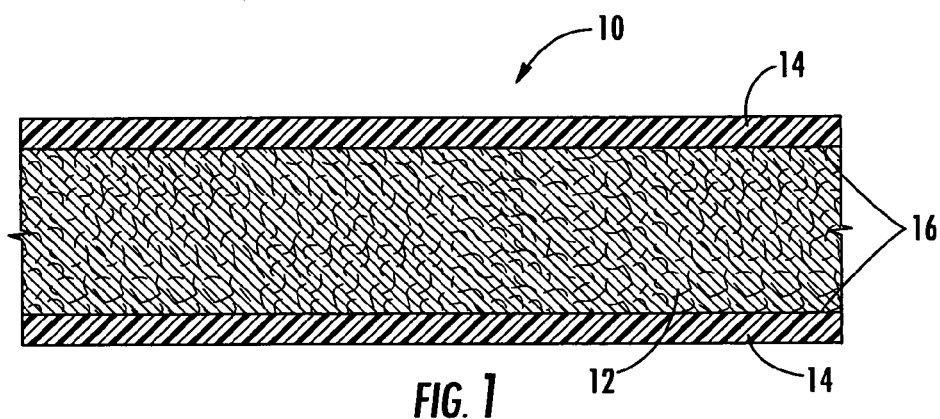
FIG. 1 is a cross-sectional view of an example of the carbon fiber substructure for a transaction card for embodiments of the invention.

FIG. 1 shows a cross-sectional view of an example of the carbon fiber substructure 10 for a transaction card for embodiments of the invention. According to embodiments of the invention, carbon fiber strands or filaments are woven into a weave pattern component 12 using commercially available equipment. Thereafter, the weave pattern component 12 is mounted between two layers 14 of thin clear plastic and adhesive 16, such as clear PVC plastic film, as shown in FIG. 1. The thin clear plastic layers 14 hold the carbon fibers together and keep the weave pattern 12 of the substructure 10 intact. The adhesive 16 fills the air voids around the carbon fibers and bonds the fibers to the PVC skin 14.

Figure 2:
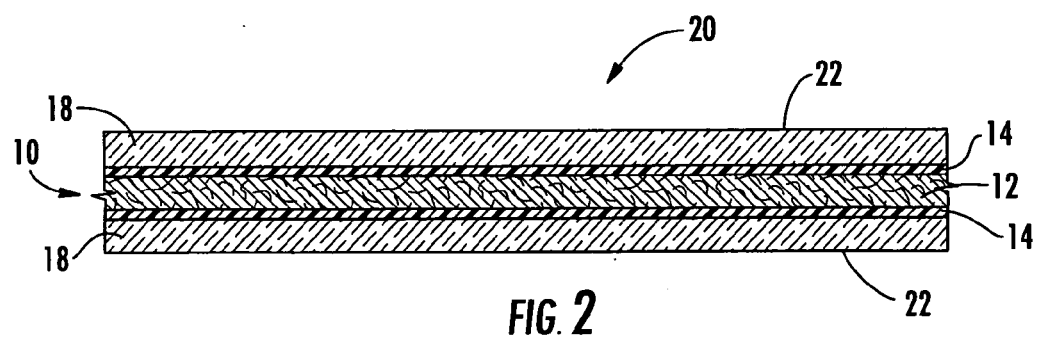
FIG. 2 is a cross-sectional view of an example of the carbon fiber substructure sandwiched between two layers of clear PVC plastic of the inner core of a transaction card for embodiments of the invention.
Figure 3:
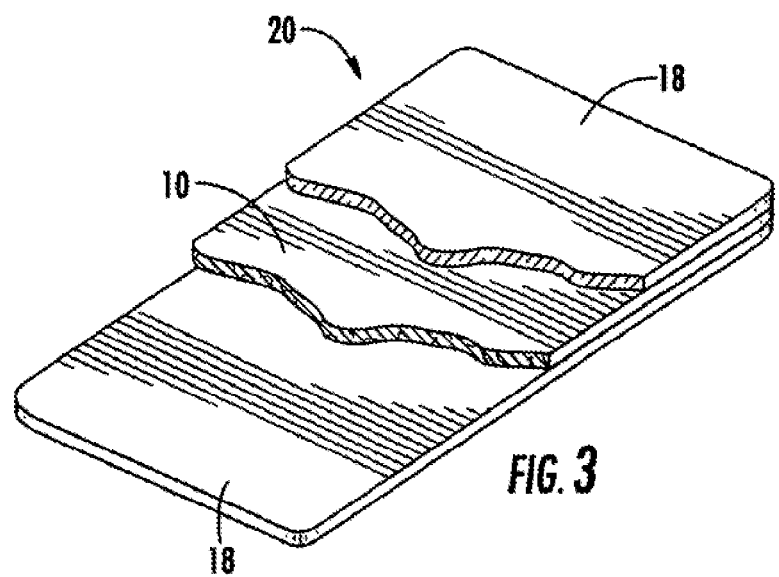
FIG. 3 is a perspective partially cut-away view of an example of the carbon fiber substructure sandwiched between two layers of clear PVC plastic of the inner core shown in FIG. 2 for a transaction card for embodiments of the invention.

The substructure 10 is thereafter mounted between clear PVC plastic layers of a transaction card, such as a credit card, and the components are then laminated together to form the inner core of the transaction card. FIG. 2 shows a cross-sectional view of an example of the carbon fiber substructure 10 sandwiched between the two layers 18 of clear PVC plastic, and FIG. 3 shows a perspective partially cut-away view of an example of the carbon fiber substructure 10 sandwiched between the two layers 18 of clear PVC plastic, to form the inner core 20 of the transaction card for embodiments of the present invention.

The outer surface 22 of the inner core 20 of the card can be printed with various text, graphics, logos, phone numbers, and the like, or other printed plastic sheets can be attached by lamination. Materials for the carbon fiber substructure 10 include various combinations of substrates such as both amorphous and biaxially oriented forms of polyethylene terephthalate (PET) plastic or combinations of both, polyvinyl chloride (PVC) plastic, other suitable plastics, adhesives such as polyethylene, acrylic, cyanoacrylate, epoxies, and carbon fibers commonly used for extreme durability strength in airplane structures, automotive components, etc.

Figure 4:
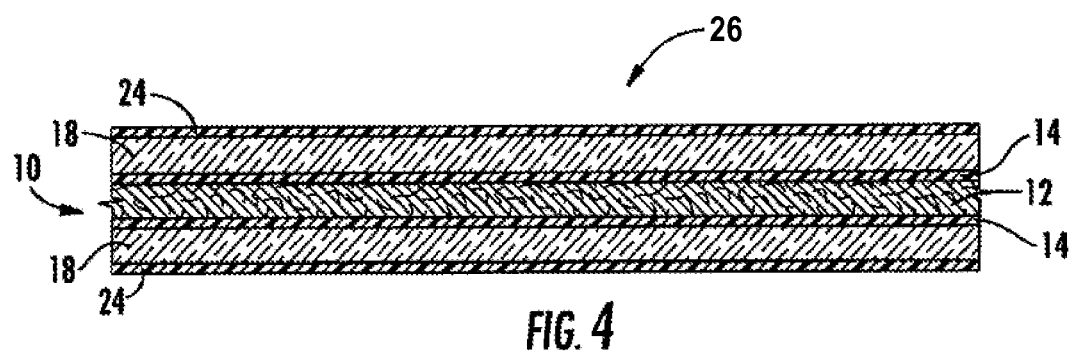
FIG. 4 is a cross-sectional view of an example of the carbon fiber substructure sandwiched between two layers of clear PVC plastic of the inner core over-laminated with clear PVC plastic film for a transaction card for embodiments of the invention.
Figure 5:
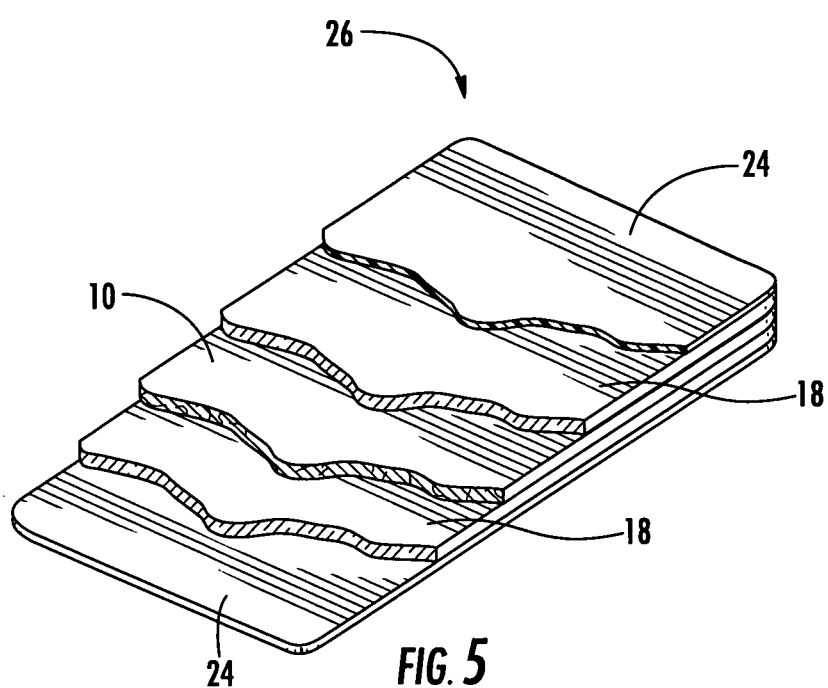
FIG. 5 is a perspective partially cut-away view of an example of the carbon fiber substructure sandwiched between two layers of clear PVC plastic of the inner core over-laminated with clear PVC plastic film over-laminates for the transaction card shown in FIG. 4 for embodiments of the invention.

Embodiments of the invention involve building the substructure 10 using polyester, polyethylene, acrylic, and/or epoxies with carbon fiber, which is then sandwiched in the middle of the card core 20 between two layers 18 of clear PVC plastic, and possibly two additional layers of thin PVC plastic over-laminate on the outer surfaces of the clear PVC plastic layers 18 of the inner core 20. It is to be understood that while embodiments of the invention employ layers 18 of PVC plastic for the card core 20, any suitable material, such as a composite of PVC and PET, can be used for layers 18 as well. FIG. 4 shows a cross-sectional view of an example of the carbon fiber substructure 10 sandwiched between two layers 18 of clear PVC plastic over-laminated with clear PVC plastic over-laminates 24, and FIG. 5 shows a perspective partially cut-away view of an example of the carbon fiber substructure 10 sandwiched between two layers 18 of clear PVC plastic which are over-laminated with clear PVC plastic over-laminates 24, in a transaction card 26 for embodiments of the present invention.

Figure 6:
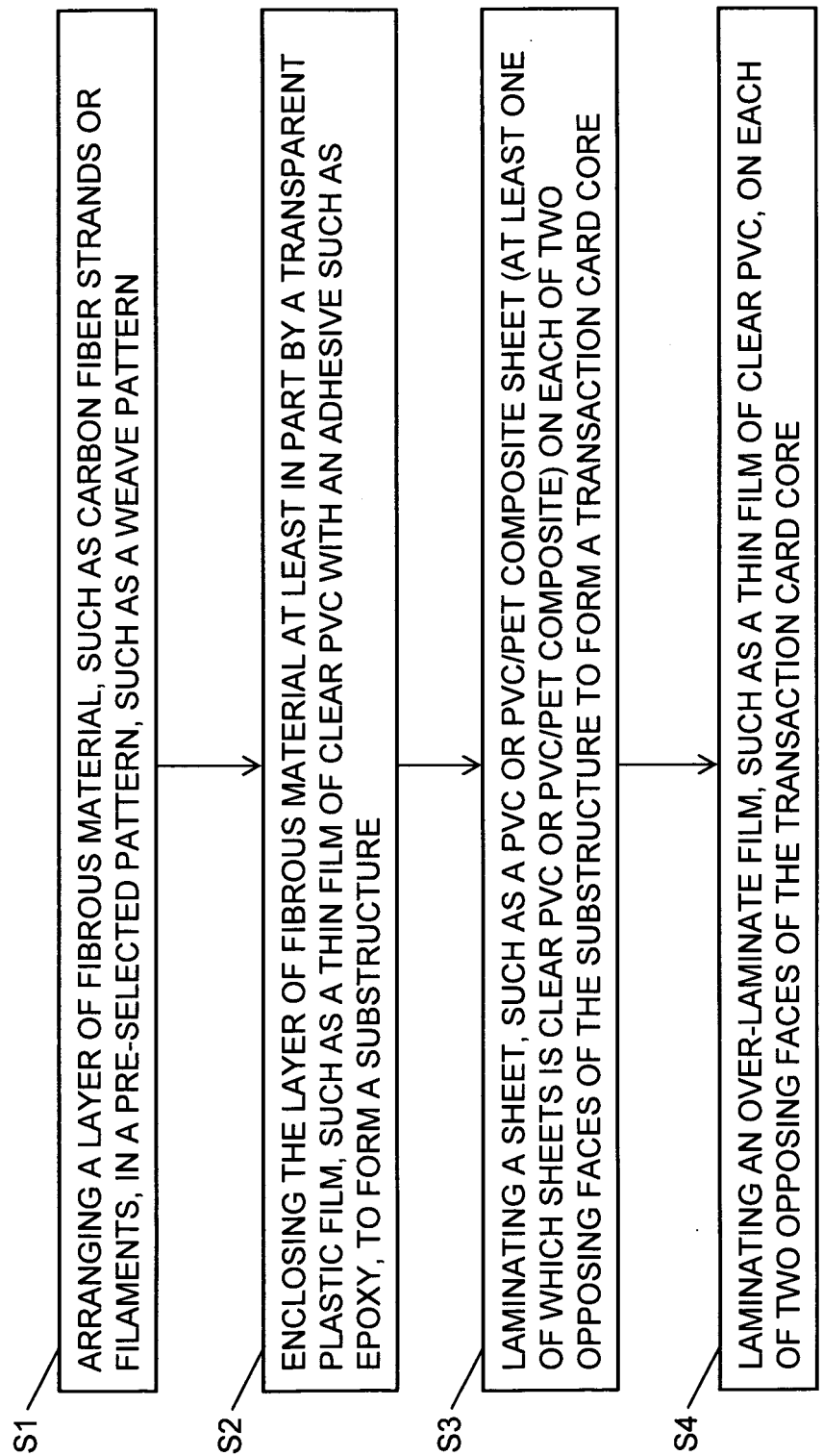
FIG. 6 is a flow chart that illustrates an example of the process of making a transaction card with a carbon fiber substructure for embodiments of the invention.

FIG. 6 is a flow chart that illustrates an example of the process of making a transaction card 26 with a carbon fiber substructure 10 for embodiments of the invention. Referring to FIG. 6, at S1, a layer of fibrous material, such as carbon fiber strands or filaments, is arranged in a pre-selected pattern 12, such as a weave pattern. At S2, the layer 12 of fibrous material is enclosed at least in part by a transparent plastic film 14, such as a thin film of clear PVC, with an adhesive, such as epoxy, to form a substructure 10. Thereafter, at S3, a plastic sheet 18, such as a PVC or PVC/PET composite plastic sheet (at least one of which sheets is clear PVC or PVC/PET composite) is laminated on each of two opposing faces of the substructure 10 to form a transaction card core 20, and at S4, an over-laminate film 24, such as a thin film of clear PVC plastic, is laminated on each of two opposing faces 22 of the transaction card core 20 to form a transaction card 26.

The carbon fiber substructure 10 gives the card 26 for embodiments of the invention strength and torque resistance, an enhanced cosmetic value with a three-dimensional effect, and the two layers 18 of clear PVC or PVC/PET composite plastic of the inner core 20 also serve as the media for printing. The transaction card 26 for embodiments of the invention has potential for extreme durability, as the carbon fibers are very lightweight but extremely strong. Further, the graphics, logos, holograms, and the like are protected by the clear thin PVC plastic over-laminates 24, if used.

As previously noted, a typical conventional credit card consists of two pieces of white PVC plastic inner core or split core materials, 13½ mils each, that are joined together to form a white PVC plastic core 27 mils thick, the back and front of which are each then over-laminated with a thin layer of clear or transparent plastic over-laminate to form a transaction card that is 30 mils thick. However, embodiments of the present invention employ a carbon fiber substructure 10 with a thickness of 10 mils more or less sandwiched between two layers 18 of clear or opaque PVC plastic (of which at least one side is clear), each of which is likewise 10 mils or less in thickness, such that the total thickness of the resulting composite 26 is 30 mils (including 2 mils±lamination film)±10%.

The carbon fiber substructure 10 for embodiments of the invention consists of the weave pattern component 12 mounted between two layers 14 of thin film clear PVC with epoxy adhesive that holds the carbon fibers together and keeps the weave pattern 12 intact. The carbon fiber substructure 10 is thus stable with a substantially flat thickness of approximately 10 mils or about one-third of the approximately 30 mils total thickness of the transaction card 26, although embodiments of the invention include carbon fiber substructures 10 having thicknesses that are greater than or less than 10 mils or greater than or less than one-third of the total thickness of the transaction card 26.

The pattern into which the carbon fiber is woven for the carbon fiber substructure 10 for embodiments of the invention can take various forms, such as something similar to a basket weave or any other type of weave pattern. Embodiments of the invention include a predetermined optimum range of carbon fiber strands per weave and a suitable manner in which the strands are overlaid on one another to form a unique appearing weave pattern. The unique weave pattern is due at least in part to the physical and/or chemical properties of the carbon fiber which contributes to its apparent change in appearance depending, for example, on the angle of incident light and the perspective from which it is viewed by an observer.

As previously noted, embodiments of the invention utilize any suitable adhesive material, such as one or more adhesive resins, in fabricating the carbon fiber substructure 10. Further, embodiments of the invention utilize other suitable materials that can be made to resemble carbon fiber including for example, mineral fibers, such as glass and/or metal fibers, and various polymer fibers in fabricating the fiber substructure.

The transaction card 26 employing the carbon fiber substructure 10 for embodiments of the invention is useable in all respects in exactly the same way as a conventional transaction card, for example, in a card reader, card printer, or other card handling mechanism. For example, the transaction card for embodiments of the invention can be tipped, embossed, can have a signature panel applied, can have a hologram applied, and can be printed, etc. in the same way as any conventional transaction card.

Further, the transaction card 26 for embodiments of the invention can be embossed, embedded with a microchip for a smart card or can have one or more magnetic stripes or other data storage media affixed to it. As noted above, embodiments of the invention involve sandwiching the carbon fiber substructure 10 approximately 10 mils or less in thickness (i.e., approximately one-third of the overall thickness of the card) between two sheets 18 of clear plastic, such as clear PVC, each approximately 10 mils or less in thickness, so that the overall thickness of the transaction card is approximately 30 mils.

In addition, embodiments of the invention include a thin over-laminate 24 of clear plastic, such as PVC film, applied to the outer surface 22 of each of the clear sheets 18 of the inner core 20 of the card 26. In any event, the total thickness of the card 26 for embodiments of the invention meets all standards applicable to conventional financial transaction cards, such as the foregoing thickness requirement. Further, although the outer layers 18 of the transaction card 26 for embodiments of the invention are transparent, the carbon fiber substructure 10 sandwiched between the transparent, tinted transparent, or in combination with opaque outer layers 18 is opaque to visible or infrared light, which likewise meets all standards applicable to credit cards.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A transaction card, comprising:
   a transaction card substructure comprising a layer of fibrous material arranged in a pre-selected pattern that is at least partially enclosed on each side by a transparent plastic film;
   a sheet laminated on each of two opposing faces of the transaction card substructure to form a transaction card core, wherein at least one of the sheets comprises a transparent material and wherein the transparent material comprises transparent polyvinyl chloride plastic; and,
   an over-laminate film laminated on each of two opposing faces of the transaction card core, wherein at least one of the over-laminate films comprises a transparent film.

2. The transaction card of claim 1, wherein the pre-selected pattern comprises a weave pattern.

3. The transaction card of claim 1, wherein the fibrous material layer comprises carbon fiber strands or filaments.

4. The transaction card of claim 1, wherein the layer of fibrous material comprises fiber strands or filaments selected from the group consisting of mineral fiber strands or filaments, glass fiber strands or filaments, metal fiber strands or filaments, and polymer fiber strands and filaments.

5. The transaction card of claim 1, wherein the transaction card substructure further comprises a substrate material selected from the group consisting of amorphous polyethylene terephthalate plastic, biaxially oriented polyethylene terephthalate plastic, and polyvinyl chloride plastic.

6. The transaction card of claim 1, wherein the transaction card substructure further comprises an adhesive material selected from the group consisting of polyethylene, acrylic, cyanoacrylate, and epoxy.

7. The transaction card of claim 1, wherein each of the sheets laminated on the two opposing faces of the transaction card substructure comprises a transparent material.

8. The transaction card of claim 7, wherein the transparent material comprises transparent polyvinyl chloride plastic.

9. The transaction card of claim 1, wherein at least one of the two opposing faces of the transaction card core is printed.

10. The transaction card of claim 1, wherein the transaction card substructure and the sheets laminated on the two opposing faces of the transaction card substructure each has a pre-determined thickness that is substantially identical.

11. The transaction card of claim 1, wherein each of the over-laminate films comprises a transparent film.

12. The transaction card of claim 11, wherein each of the over-laminate films comprises a transparent polyvinyl chloride plastic film.

13. The transaction card of claim 1, wherein each sheet laminated on each of two opposing faces of the transaction card substructure is approximately 10 mils or less in thickness.

14. The transaction card of claim 1, wherein the transaction card substructure is approximately one-third of the overall thickness of the transaction card.

15. The transaction card of claim 1, wherein the transaction card substructure is approximately 10 mils or less in thickness.

* * * * *

UNITED STATES PATENT AND TRADEMARK OFFICE
CERTIFICATE OF CORRECTION

PATENT NO. : 9,440,481 B1
APPLICATION NO. : 12/078762
DATED : September 13, 2016
INVENTOR(S) : Todd S. Thomson et al.

Page 1 of 1

It is certified that error appears in the above-identified patent and that said Letters Patent is hereby corrected as shown below:

On Letters Patent title page item 73 the Assignee name should be corrected to include "(USA)".

Please change "Citicorp Credit Services, Inc." to -- Citicorp Credit Services, Inc. (USA) --.

Signed and Sealed this
First Day of November, 2016

Michelle K. Lee
*Director of the United States Patent and Trademark Office*